Feb. 6, 1945.    R. L. HALLOWS ET AL    2,368,922
MANUFACTURE OF ZINC OXIDE
Filed July 7, 1942
○
A
4 MICRONS
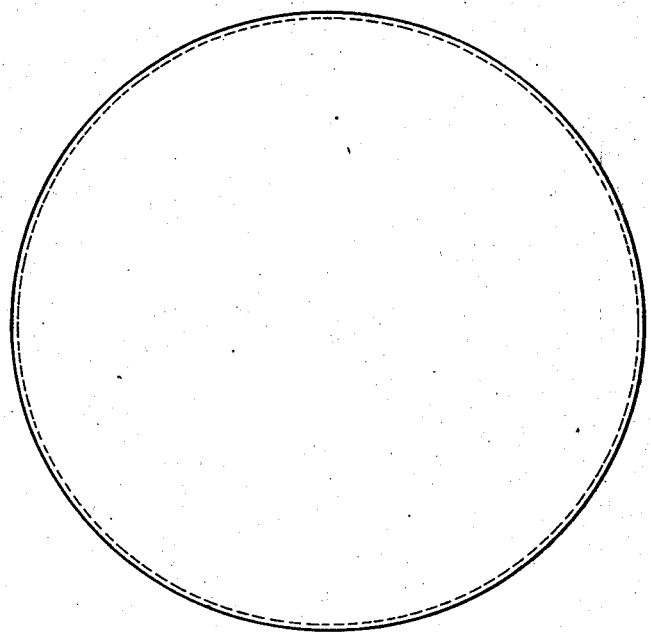
B
25 MICRONS
C
250 MICRONS
INVENTORS.
Raymond L. Hallows
and Frederick Clearman
Herldon Bowen Atty.

Patented Feb. 6, 1945

2,368,922

UNITED STATES PATENT OFFICE 2,368,922

MANUFACTURE OF ZINC OXIDE

Raymond L. Hallows and Frederick Clearman, Joplin, Mo., assignors to The Eagle-Picher Lead Company, Cincinnati, Ohio, a corporation of Ohio Application July 7, 1942, Serial No. 450,016

4 Claims. (Cl. 23—148)

This invention relates to the manufacture of zinc oxide from zinc sulphide and has for its object the production of zinc oxide adaptable for use in paint, ceramic and other industries, by dispersing zinc sulphide of a critical range of particle size into a heated zone where it is oxidized and partially volatilized and the liberation of impurities is substantially minimized. In the production of fumed zinc oxide from zinc sulphide by our method, the zinc sulphide is "flash-fumed" by which term as used in the specification and claims we mean the combustion or oxidation of a suspension of finely divided particles dispersed in an oxidizing gaseous medium with the simultaneous production of vapors or fumes of metallic compounds. It is to be distinguished from the suspension process of roasting zinc sulphide mineral with minimum fuming for subsequent treatment either by pyro- or hydro-metallurgical methods.

In the practice of flash-fuming zinc sulphide the finely divided particles of the mineral are dispersed or blown into an enclosed refractory chamber such as a standard rotary kiln or box-shaped furnace, along with air for their combustion, much as in the well-known procedure for burning powdered coal. The temperature attained by the particles in the flash fuming furnace must be sufficient to form zinc oxide and partially volatilize the zinc oxide as formed, and since the oxidation of the zinc sulphide does not in itself furnish enough heat to accomplish this purpose some additional heat must be supplied. We prefer to do this by introducing fuel such as natural gas simultaneously and along with the zinc sulphide.

Prior to our invention and discovery, many attempts have been made to manufacture zinc oxide of commercial grade by flash-fuming finely-divided zinc sulphide mineral and collecting the resultant fume, but in each instance the product had a high impurity content which rendered it unadaptable as a white pigment. We have determined that the most detrimental impurities preventing the adaptation of zinc oxides, produced by prior flash-fuming methods, for use as white pigments, were iron and copper compounds and that these were present due to their liberation from iron and copper compounds originally present in solid solution in the crystals of natural zinc sulphide, and so inherently a part thereof as to be impossible of complete preliminary separation therefrom by grinding, jigging, tabling, flotation, leaching, or other known methods. When such a natural zinc sulphide in finely-divided form, containing a heterogeneous mixture of particle sizes including a considerable percentage of particles of less than five microns, diameter, is introduced in suspension into a heated zone and flash-fumed, the iron and copper compounds in the finer particles are liberated and carried along in suspension with the products of combustion in quantities such that the resulting fumed product is not adaptable for use in the paint, ceramic and other industries.

The development of a satisfactory method to produce zinc oxide adaptable for use as a white pigment from natural zinc sulphide by flash-fuming has long been sought for in industry and many such attempts have been made but so far as we are aware all previous efforts have ended in failure. We have found that the principal reason for these previous failures was the lack of realization of the detrimental effect of the extremely fine particles, of less than five microns diameter, and lack of realization that the zinc in each of the individual particles of zinc sulphide must be only partially volatilized, in order that the residuum of each particle, containing the detrimental impurities, may have sufficient mass to enable it to be readily separated from the zinc oxide fume product. In conducting extensive experiments we have made the new and novel discovery that, if natural zinc sulphide can be dispersed into a flash fuming furnace in such suitably delimited range of particle size that zinc oxide fume can be produced while at the same time the liberation of certain impurities in solid solution in the zinc sulphide crystals, and especially the copper and iron, is substantially minimized, we can produce zinc oxide of a quality adaptable for use in the paint, ceramic and other industries.

As a result of our investigation we have found that, if the burning zinc sulphide particles flash-fumed are too fine most of the zinc oxide formed is volatilized, leaving the residual iron and copper compounds in such an ultra-fine state of subdivision that they are carried along in suspension with the zinc oxide fume and collected with it. In order to produce zinc oxide adaptable to pigment use, the individual particles of zinc sulphide flash-fumed should decompose only partially, and this necessitates the removal of the ultra-fine particles prior to the flash-fuming operation. However, the zinc sulphide particles must be small enough to reach a volatilizing temperature in the time they are exposed to intense heat. We have further found that when zinc sulphide of predetermined proper grain size, as will later be more particularly described, is flash-fumed, the particles must be small enough to permit a substantial portion of the zinc oxide formed to be volatilized and at the same time large enough that the zince sulphide crystals do not completely decompose but retain sufficient mass so that most of the impurities originally present in the zinc sulphide crystals are retained in place and separate out with the unfumed residue separately from the zinc oxide product, leaving the latter substantially free from impurities such as iron and copper.

This difference in result when various sizes of particles are flash-fumed is obvious from an examination of Figure I, which shows in diagrammatic form, three different spherical particles of zinc sulphide, magnified five hundred times.

"A" illustrates a particle 4 microns in diameter, "B" one of 25 microns diameter, and "C" one of 250 microns diameter. If all three particles are simultaneously exposed to the same temperature for the same time in the same oxidizing atmosphere, a surface layer will be volatilized which will be approximately the same thickness in all three particles. This surface layer is indicated in the drawing by the space between the outer circumference of the particles and the concentric inner dotted circles which represent the circumference of the residual particles after the outer layer has volatilized. Any non-volatilized impurities from this layer tend to melt or sinter and adhere to the residual particles, while the vapor of zinc oxide as it cools and leaves the furnace condenses separately as zinc oxide fume.

In the case of particle "A," of 4 micron diameter, it is obvious that the zinc oxide will be practically completely volatilized, leaving such a minutely small residual particle that it will be swept along with the zinc oxide fume and will be impossible to separate from the latter by mechanical means. In the case of particle "C," on the other hand, a comparatively large residual particle will remain after the volatilization of the surface layer, which, with the impurities adhering to it, will quickly settle to the bottom of the furnace and thus separate from the zinc oxide fume; however, the volatilized layer constitutes such a small portion of the total mass of the particle that the amount of zinc oxide produced will be low as compared to the amount of residual material.

The case of particle "B" represents a compromise between the two extremes. The volatilized portion represents a substantial part of the original particle and thus gives a substantial recovery of zinc oxide fume, while at the same time the residual particle is large enough to settle out and separate from the fume in the furnace or flue system.

It would obviously be preferable to flash-fume particles all of exactly the same size. It is impracticable to do this, however, in commercial operation, and we have found that we can approach our objective sufficiently closely by using particles within a limited range of size.

The size of zinc sulphide particles suitable in the practice of our invention varies with the conditions maintained in the flash-fuming furnace, and, by suitably changing these conditions, a considerable variation in particle size is permissible. However, we have found that even with the most favorable furnace conditions it is impossible to obtain satisfactory results with zinc sulphide containing more than a small proportion by weight of particles less than 5 microns in diameter, as when such particles are flash-fumed they are volatilized to such an extent that their iron content and copper content are largely collected with the zinc oxide product and discolor it.

We have also found that zinc sulphide containing more than a minor percentage of particles larger than approximately 500 microns is unsatisfactory because even with the most favorable furnace conditions only a small fraction of such large particles is volatilized and the recovery of fumed zinc oxide product is therefore small. We have found it necessary in the practice of our invention to introduce into the flash-fuming furnace zinc sulphide mineral which comprises particles 5 to 500 microns in diameter. These limits of 5 to 500 microns are regarded as critical.

Although satisfactory results can be obtained with any particle size within the critical range of 5 to 500 microns, the zinc sulphide should preferably not contain particles varying within the entire range. Furnace conditions must be so adjusted that the smallest particles will be only partially volatilized, and, if the range of particle size is too broad, the larger particles are not heated to volatilizing temperature or at most are volatilized to only a minor extent and the recovery of zinc oxide is low; if furnace conditions are so adjusted as to volatilize a substantial portion of the larger particles, the smaller particles are volatilized to such an extent that their iron and copper content are carried along with and contaminate the zinc oxide produced.

We, therefore, prefer that the zinc sulphide used should be closely sized to comprise particles which consist of a fairly uniform size; the optimum flash-fuming furnace conditions to suit this particle size may then be maintained to give a maximum recovery of zinc oxide consistent with low impurity content of the latter. While it is desirable that the zinc sulphide should be sized within as close limits as possible, in practice it may be necessary for economic reasons to be satisfied with wider limits than would be metallurgically desirable and consequently to be satisfied with a somewhat lower quality product that would result from closer limits. For example, in practice, we have had satisfactory success using zinc sulphide comprising particles varying in size between 75 and 300 microns diameter. We have also had good success with zinc sulphide consisting of particles varying in size from 20 to 125 microns, and again with zinc sulphide consisting of particles varying from 10 to 75 microns diameter.

In each case, the furnace conditions were suitably adjusted to give best results with the range of particle size employed. By furnace conditions, we mean the temperature, the time of exposure of the individual particles to said temperature and the partial pressures of the gases in contact with the particles. The critical temperature is that of the particles themselves or the gas immediately surrounding them. This temperature is appreciably higher than the average temperature in the furnace or in the combustion zone and must be high enough for zinc oxide to have an appreciable vapor pressure.

It is impossible to measure the temperature of the individual particles as they are in rapid motion, and are too small to permit the application of any means of temperature measurement known to us. Published information on the vapor pressure of zinc oxide is meagre and of doubtful accuracy. According to U. S. Bureau of Mines, Bulletin 324, page 20, the vapor pressure ranges from 0.45 mm. at 1350 C. or 2642° F. to 13 mm. at 1500° C. or 2732° F. Reasoning from this, we believe that the temperature of the individual particles in our process must not be less than 2400° to 3000° F. The temperature of the furnace surrounding the flame and burning particles is not critical. It is less than the above stated temperatures and may vary according to the dimensions of the furnace and will differ in different parts of the furnace. It may, for example, be approximately 2200° F. measured at the furnace wall. In practice, the necessary conditions for maintaining the temperature of the particles at the proper degree may readily be determined by those experienced in the art for any given furnace design and range of particle size.

The temperature, and the time of exposure of the individual particles to said temperature, may be controlled by varying the temperature and length of flame, which, in turn, is controlled by varying the quantity of fuel and ratio of fuel to air supplied. A large amount of fuel and a small air-to-fuel ratio give a long flame which exposes the zinc sulphide particles to a volatilizing temperature longer than when a small amount of fuel and a large air-to-fuel ratio are used. When using small particles, we use a small amount of fuel and a large air-to-fuel ratio to produce a short flame and thus expose the small particles to volatilizing temperature for a relatively short time. When using large particles, we use a large amount of fuel and a small air-to-fuel ratio to produce a long flame and thus expose the large particles to volatilizing temperatures for a relatively long time. The partial pressures of the gases and particularly the partial pressure of zinc oxide vapor present, are also affected by the volume of air drawn through the furnace, which may be regulated by the draft on the furnace and the size of the openings for admission of air into the furnace.

The expressions "short flame" and "long flame" are relative and the actual length may vary considerably according to the type of furnace used. In one typical furnace with which we have operated in the commercial practice of our invention a "short flame" may mean one of approximately 5 feet long and a "long flame" one of 30 feet long.

In flash-fuming by our process a large portion of the non-volatilized residue, particularly the larger particles, settle to the floor of the fuming furnace, but a considerable portion, especially the finer particles may be carried out of the furnace along with the fume and furnace gases. These particles must be separated from the fume and this may be accomplished by various well-known methods as, for example, by settling chambers, by cyclone separators, by a long flue of comparatively large cross-sectional area including, if desired, baffles or turns in direction to produce dead air spaces, eddy currents, and centrifugal effects, or by any other suitable means for separating the larger and heavier particles from the fine and fluffy fume. The velocity of the gases passing through the flash-fuming furnace and the flue and separatory system must be such as to obtain the optimum effect of whatever separation means are employed. The velocity of the gases may be controlled by varying the speed of a fan used to induce a draft through the system, or by opening or closing a damper in the fan inlet or outlet, or by any other well-known method, and the optimum velocity may be readily determined by varying the velocity until best results are obtained.

In passing through the flue and separatory system, the gases are cooled to a temperature which will permit the collection of the zinc oxide fume and its separation from the gases. The collection of the zinc oxide fume may be accomplished by a baghouse, Cottrell precipitator, or by any other well-known means.

Closely-sized zinc sulphide particles suitable for making zinc oxide by our process can be classified or arranged in groups comprising predetermined particle sizes by various well-known methods, such as hydraulic, mechanical, or air classification, by jigs, by tables, by a combination thereof or other suitable methods.

All the equipment used by us in the practice of our invention is of standard types which can readily be procured in the open market or built according to well-known design.

Without desiring to restrict ourselves to the proportions named, we will give an example of one method for carrying out our process which will possess the advantages described, it being understood the same is susceptible of modification and change and comprehends other details, methods and features without departing from the spirit of our invention.

From a concentrating mill in the Picher, Oklahoma, district a flotation zinc concentrate containing the normal amount of slimes was secured. This concentrate analyzed: zinc 61.2%, lead .4%, copper .08%, cadmium .43%, iron 1.1%, and had the following particle size distribution:

*Microns diameter*

|        |     |       |     |        |
|--------|-----|-------|-----|--------|
|        |     | Plus  | 210 | 13.51% |
| Minus  | 210 | Plus  | 150 | 16.73% |
| Minus  | 150 | Plus  | 100 | 17.54% |
| Minus  | 100 | Plus  | 74  | 11.70% |
| Minus  | 74  | Plus  | 53  | 7.95%  |
| Minus  | 53  | Plus  | 37  | 6.84%  |
| Minus  | 37  | Plus  | 26  | 5.88%  |
| Minus  | 26  | Plus  | 18  | 5.79%  |
| Minus  | 18  | Plus  | 13  | 5.15%  |
| Minus  | 13  | Plus  | 9   | 2.03%  |
| Minus  | 9   | Plus  | 6   | 1.13%  |
| Minus  | 6   | Plus  | 4.6 | 0.61%  |
| Minus  | 4.6 | Plus  | 3.2 | 0.89%  |
| Minus  | 3.2 | Plus  | 2.3 | 0.81%  |
| Minus  | 2.3 | Plus  | 1.6 | 1.42%  |
| Minus  | 1.6 | Plus  | 1.1 | 0.89%  |
| Minus  | 1.1 |       |     | 1.13%  |

100.00%

From this material, by hydraulic classification followed by tabling, a thoroughly-deslimed and closely-sized zinc sulphide was separated which analyzed: zinc 64.1%, lead 0.11%, copper 0.056%, cadmium 0.41%, iron 0.87%, and had the following particle size distribution:

*Microns diameter*

|        |     |       |     |        |
|--------|-----|-------|-----|--------|
|        |     | Plus  | 210 | 3.72%  |
| Minus  | 210 | Plus  | 150 | 14.96% |
| Minus  | 150 | Plus  | 100 | 29.75% |
| Minus  | 100 | Plus  | 74  | 24.01% |
| Minus  | 74  | Plus  | 53  | 19.51% |
| Minus  | 53  | Plus  | 37  | 5.51%  |
| Minus  | 37  | Plus  | 26  | 1.30%  |
| Minus  | 26  | Plus  | 18  | 0.39%  |
| Minus  | 18  | Plus  | 13  | 0.22%  |
| Minus  | 13  | Plus  | 9   | 0.19%  |
| Minus  | 9   | Plus  | 6   | 0.19%  |
| Minus  | 6   | Plus  | 4.6 | 0.14%  |
| Minus  | 4.6 | Plus  | 3.2 | 0.11%  |
| Minus  | 3.2 | Plus  | 2.3 | .00%   |
| Minus  | 2.3 | Plus  | 1.6 | .00%   |
| Minus  | 1.6 | Plus  | 1.1 | .00%   |
| Minus  | 1.1 |       |     | .00%   |

100.00%

This zinc sulphide was dried and dispersed, by blowing with a jet of compressed air, into one end of a flash-fuming furnace which consisted of a horizontal elongated firebrick chamber. Surrounding the jet for injecting and dispersing the zinc sulphide was a ring shaped burner through which natural gas was introduced as fuel. The temperature of the furnace, as measured at the sidewall of the furnace near the zone of combustion, was 2200° F. The zinc sulphide was ignited by the heat of the gas flame and was partially oxidized and converted to zinc oxide fume that was carried, in suspension in the furnace gases, through a separatory and cooling system which comprised a cooling and settling flue, a cyclone separator, and a fan, to a bagroom where it was filtered from the gases, while the non-volatilized residual particles containing most of the impurities separated out in the furnace and in the separatory and cooling system. The material which settled to the bottom of the furnace analyzed: zinc 67.3%, copper .1%, iron 1.0% and sulphur 16.6%. The material collected in the cyclone separator analyzed: zinc 67.9%, iron 2.6%, copper 0.15%. The zinc oxide product collected in the bagroom analyzed: zinc 74.8%, lead 0.26%, copper 0.016%, cadmium .5%, iron 0.014%, zinc sulphate 6.6%, sulphur 1.7%.

This application is a continuation in part of our application Serial Number 325,574 filed in the United States Patent Office March 23, 1940.

Having thus disclosed our invention, what we claim as new and desire to secure by Letters Patent is:

1. The process of continuously producing zinc oxide from zinc sulphide by flash-fuming with a substantially minimized liberation of iron and copper compounds present in the zinc sulphide, which comprises taking particles of zinc sulphide within a range of 5 to 500 microns in diameter, dispersing said particles into an oxidizing atmosphere, heating to a temperature sufficient to form an outer layer of zinc oxide on the particles and continuing the heating to a temperature sufficient to volatilize the zinc oxide from the particles and separating said volatilized zinc oxide from the unvolatilized iron and copper compounds in the residual portions of the particles.

2. The process of continuously producing zinc oxide from zinc sulphide by flash-fuming with a substantially minimized liberation of iron and copper compounds present in the zinc sulphide, which comprises taking particles of zinc sulphide of substantially uniform size within a range of 5 to 500 microns in diameter, dispersing said particles into an oxidizing atmosphere, heating to a temperature sufficient to form an outer layer of zinc oxide on the particles and continuing the heating to a temperature sufficient to volatilize the zinc oxide from the particles and separating said volatilized zinc oxide from the unvolatilized iron and copper compounds in the residual portions of the particles.

3. The process of continuously producing zinc oxide, from zinc sulphide by flash-fuming with a substantially minimized liberation of iron and copper compounds present in the zinc sulphide, which comprises taking closely sized particles of zinc sulphide within a range of 5 to 500 microns in diameter, dispersing said particles into an oxidizing atmosphere, heating to a temperature sufficient to form an outer layer of zinc oxide on the particles and continuing the heating to a temperature sufficient to volatilize the zinc oxide from the particles and separating said volatilized zinc oxide from the unvolatilized iron and copper compounds in the residual portions of the particles.

4. The process of continuously producing zinc oxide from zinc sulphide by flash-fuming with a substantially minimized liberation of iron and copper compounds present in the zinc sulphide, which comprises taking particles of zinc sulphide of a narrow size range within the range of 5 to 500 microns in diameter, dispersing said particles into an oxidizing atmosphere, heating to a temperature sufficient to form an outer layer of zinc oxide on the particles and continuing the heating to a temperature sufficient to volatilize the zinc oxide from the particles and separating said volatilized zinc oxide from the unvolatilized iron and copper compounds in the residual portions of the particles.

RAYMOND L. HALLOWS.
FREDERICK CLEARMAN.